US006970498B1

(12) United States Patent
Chung

(10) Patent No.: US 6,970,498 B1
(45) Date of Patent: Nov. 29, 2005

(54) RADIO FREQUENCY RECEIVER FOR CDMA MOBILE COMMUNICATION BASE STATION SYSTEM

(75) Inventor: Chae Hun Chung, Ichon (KR)

(73) Assignee: UTStarcom, Inc., Alemeda, CA (US)

( * ) Notice: Subject to any disclaimer, the term of this patent is extended or adjusted under 35 U.S.C. 154(b) by 792 days.

(21) Appl. No.: 09/669,280

(22) Filed: Sep. 26, 2000

(30) Foreign Application Priority Data

Oct. 5, 1999 (KR) .............................. 1999-42860

(51) Int. Cl.[7] .............................................. H04B 1/69
(52) U.S. Cl. ..................................................... 375/147
(58) Field of Search ................................ 375/316, 340, 375/147, 140, 130; 370/464, 480, 310, 319, 370/329, 328, 320, 330, 344, 343, 351, 430, 370/441, 443, 442

(56) References Cited

U.S. PATENT DOCUMENTS

| | | | |
|---|---|---|---|
| 5,422,908 A * | 6/1995 | Schilling | ..................... 375/130 |
| 5,844,935 A | 12/1998 | Shoji | |
| 5,933,457 A | 8/1999 | Hottinen | |
| 5,974,038 A | 10/1999 | Shou et al. | |
| 6,169,733 B1 * | 1/2001 | Lee | ............................ 370/342 |
| 6,493,397 B1 * | 12/2002 | Takahashi et al. | .......... 375/285 |
| 6,665,348 B1 * | 12/2003 | Feher | ......................... 375/259 |
| 6,788,729 B1 * | 9/2004 | Posti | .......................... 375/133 |

* cited by examiner

Primary Examiner—Tesfaldet Bocure
Assistant Examiner—Pankaj Kumar
(74) Attorney, Agent, or Firm—McDonnell Boehnen Hulbert & Berghoff LLP

(57) ABSTRACT

The RF receiver for the CDMA mobile communication BTS system according to the present invention realizes the system with an analog down-converter to process multiple FA's and generate IF signals of 70 MHz having a bandwidth corresponding to the multiple FA's with a mixer, and a digital down-converter to digitally process the respective FA's through A/D conversion of the IF signals of 70 MHz, allowing simple multi-FA(3FA)-based expansion. Also, the system needs only one analog down-converter for simultaneously processing 3 FA's and one digital down-converter for digitally processing the IF signals from the analog down-converter by FA's to down-convert the IF signals to baseband signals, thereby reducing the size of the system and hence the hardware cost. The system can be implemented with higher stability by digitally processing the down-conversion of the analog IF signals of multiple FA's to the baseband signals.

6 Claims, 4 Drawing Sheets

RADIO FREQUENCY RECEIVER FOR CDMA MOBILE COMMUNICATION BASE STATION SYSTEM

BACKGROUND OF THE INVENTION

1. Field of the Invention

The present invention relates to a radio frequency (RF) receiver for a code division multiple access (CDMA) mkobile communication base transceiver station (BTS) system and, ore particularly, to an RF receiver for a CDMA mobile communication BTS system contrived to down-convert RF signals of 3 frequency allocation (FA)'s to intermediate frequency (IF) signals, convert the 3FA IF signals to digital signals, and digitally perform the FA-based quadrature phase shift keying (OPSK) demodulation and channel filtering.

2. Description of the Related Art

A general CDMA mobile communication BTS system is composed of a switching system and cell equipment. Here, the system is constituted by a plurality of functional devices which are implemented with various forms of equipment.

The nucleus of the mobile communication BTS system is implemented with a digital self embedding a channel card, a sector interface card, an analog common card and a terminal card, and a transceiver self for up-converting an IF signal output from the digital self to an RF signal, or down-converting the RF signal to the IF signal.

The transceiver self also embeds a sector interface card for combining the forward baseband signals received from the channel card and up-converting the combined signals to IF signals. The sector access card combines the baseband transmission signals received from the analog common card and amplifies the combined signals. The combined signals are passed through a low-pass filter (LPF) into IF signals, i.e., the signals are combined with 0° or 90° delay signals of 4.95 MHz and sent to an RF rack as IF signals of 4.95 MHz via a band-pass filter (BPF). The RF rack converts the IF signals of 4.95 MHz to RF signals.

Now, a description will be given to a general CDMA digital mobile communication BTS system with reference to FIG. 1.

FIG. 1 is a schematic block diagram of the general CDMA digital mobile communication BTS system.

As illustrated, the CDMA digital mobile communication BTS system includes: a BTS control processor (BCP) 2 for entirely managing and controlling a BTS; a BTS interconnection network (BIN) 3 for performing the function of a packet router between the BTS and a base station controller (BSC) 1 via a line E1 or T1, and interfacing high-level data link control (HDLC) packet data between the respective processors provided in the BTS; a time and frequency unit (TFU) 4 for generating a reference frequency and a timing sync signal to acquire synchronization between the respective processors in the BTS and timing synchronization with neighboring BTS's; a digital unit (DU) 5 for modulating/demodulating data and voice signals communicated via CDMA channels; and an RF unit (RFU) 6 for converting an RF signal received from a mobile station to an IF signal, transmitting the IF signal to the DU 5, converting the IF signal received from the DU 5 to the RF signal and amplifying the RF signal to a predetermined level for spatial distribution. Here, the RFU 6 is divided into an RF transmitter for converting the IF signal to the RF signal and transmitting the RF signal to the mobile station via an antenna, and an RF receiver for converting the RF signal received from the mobile station to the IF signal.

The RF receiver according to prior art will now be described in further detail with reference to FIG. 2.

FIG. 2 is a schematic block diagram of the RF receiver for the CDMA mobile communication BTS system according to prior art, which includes two antennas 10 and 15 to attain diversity, FA-based RF down-converters 30, 31 and 32, FA-based analog IF units 40, 41 and 42, and FA-based channel cards 50, 51 and 52.

The RF receiver supporting antenna diversity has two physical reception paths of "0" and "1". The first antenna 10 and a first receive block 20 are assigned to the reception path of "0", the second antenna 15 and a second receive block 25 assigned to the reception path of "1".

All the first, second and third RF down-converters 30, 31 and 32 and the first, second and third analog IF units 40, 41 and 42 have two blocks for independently processing the reception paths of "0" and "1" and support both the reception paths of "0" and "1".

The first and second antennas 10 and 15 and the first and second receive blocks 20 and 25 are used in common to all FA's assigned, and the first to third RF down-converters 30, 31 and 32 and the first to third analog IF units 40, 41 and 42 are used by FA's.

The first, second and third channel cards 50, 51 and 52 are provided at least one in number and used by FA's. For example, the RF receiver for the CDMF system supporting 4 FA's has two antennas, two receive blocks, four RF down-converters, and four analog IF units, and thus includes at least four channel cards.

Now, a description will be made as to an operation of the above-structured RF receiver supporting 3 FA's according to prior art.

First, the first and second receive blocks 20 and 25 receive RF signals from the first and second antennas 10 and 15, respectively, limiting the band of the signal using a band-pass filter (not shown), and amplify the band-pass filtered signals to a predetermined level with a linear noise amplifier (not shown). The first and second receive blocks 20 and 25 then output the amplified RF signals, i.e., the RF signals on the reception paths of "0" and "1", respectively, to the first, second and third RF down-converters 30, 31 and 32.

The first, second and third down-converters 30, 31 and 32 receive the RF signals on the reception paths of "0" and "1" from the first and second receive blocks 20 and 25, down-convert the received RF signals to IF signals with a two-stage mixer (not shown) and a local oscillator (not shown) and output the converted IF signals to the FA-based first, second and third analog IF units 40, 41 and 42.

That is, each of the first, second and third RF down-converters 30, 31 and 32 first down-converts the RF signals to IF signals of about 70 MHz via the local oscillator and the mixer provided at the first stage and second down-converts the IF signals of the 70 MHz to IF signals of the 4.95 MHz via the local oscillator and the mixer provided at the second stage, concurrently limiting the band of the signals with an SAW filter having a passband of 1.25 MHz that corresponds to the bandwidth of one FA.

Each of the first, second and third analog IF units 40, 41 and 42 by FA's receives the IF signals of corresponding FA's on the reception paths of "0" and "1" output from the FA-based first, second and third RF down-converters 30, 31 and 32, divides the IF signals into I (In-phase) and Q (Quadrature) channels, down-converts the I/Q channel IF signals to a baseband to perform quadrature phase shifting keying demodulation, and A/D converts the I/Q channel analog baseband signals to digital baseband signals.

The FA-based analog IF units 40, 41 and 42 multiplex the I/Q channel digital baseband signals on the reception paths of "0" and "1" and transmit them to the channels cards 50, 51 and 52 corresponding to the respective FA's.

The FA-based channel cards 50, 51 and 52 receive the multiplexed I/Q channel digital baseband signals on the reception paths of "0" and "1" to perform CDMA demodulation by FA's.

As the conventional RF receiver for the CDMA mobile communication BTS system uses RF down-converters and analog IF units by FA's, the system can by expanded by no more than one FA during FA expansion.

Therefore, in order to process multiple FA's, for example, 3 FA's, there are needed to provide three RF down-converters and three analog IF units with a consequence of increased size of the RF receiver and hence the BTS system, thus raising the hardware cost.

Furthermore, the RF receiver has a limitation on reducing the size of the board due to a need of two mixers in the RF down-converter.

SUMMARY OF THE INVENTION

It is, therefore, an object of the present invention to provide an RF receiver for a CDMA mobile communication BTS system contrived to simultaneously down-convert RF signals of 3 FA's to IF signals, convert the 3FA IF signals to digital signals and then digitally perform the FA-based QPSK demodulation and channel filtering, thereby reducing the size and hardware cost of the RF receiver and allowing multi-expansion of the FA's.

To achieve the above object of the present invention, there is provided an RF receiver for a CDMA mobile communication base station system, which has a plurality of receive blocks for receiving RF signals via a plurality of antennas, and a plurality of FA-based channel cards, the RF receiver including: an analog down-converting converter for down-converting multi-FA RF signals on the respective reception paths output from the plural receive blocks to IF signals; and a digital down-converter for converting the IF signals of 3 FA's on the respective reception paths output from the analog down-converter to digital signals by reception paths, dividing the digital signals into I and Q channels of the FA's on the respective reception paths to down-convert the digital signals to I/Q channel baseband signals, and generating the FA-based I/Q channel baseband signals to the channel cards corresponding to the respective FA's.

In another aspect of the present invention, there is provided an RF receiver for a CDMA mobile communication base station system, which has two receive blocks for receiving RF signals via two antennas, and FA-based channel cards, the RF receiver including: an analog down-converter for down-converting multi-FA RF signals on first and second reception paths output from the two receive blocks to IF signals; two analog-to-digital converters for converting the down-converted IF signals on the first and second reception paths from the analog down-converter to digital signals; FA-based digital units on the first and second reception paths for dividing the digital signals output from the two analog-to-digital converters into FA-based I and Q channels on the first and second reception paths to perform QPSK demodulation, and down-converting the I/Q channel digital signals to baseband signals; and a multiplexer for multiplexing the first and second reception paths and the I/Q channel baseband signals on the first and second reception paths output from the FA-based digital units and generating the multiplexed digital signals to the channel cards corresponding to the respective FA's.

DETAILED DESCRIPTION OF THE PREFERRED EMBODIMENT

Hereinafter, preferred embodiments of an RF receiver of a CDMA mobile communication BTS system according to the present invention will be described in detail with reference to the accompanying drawings.

Figure 1:
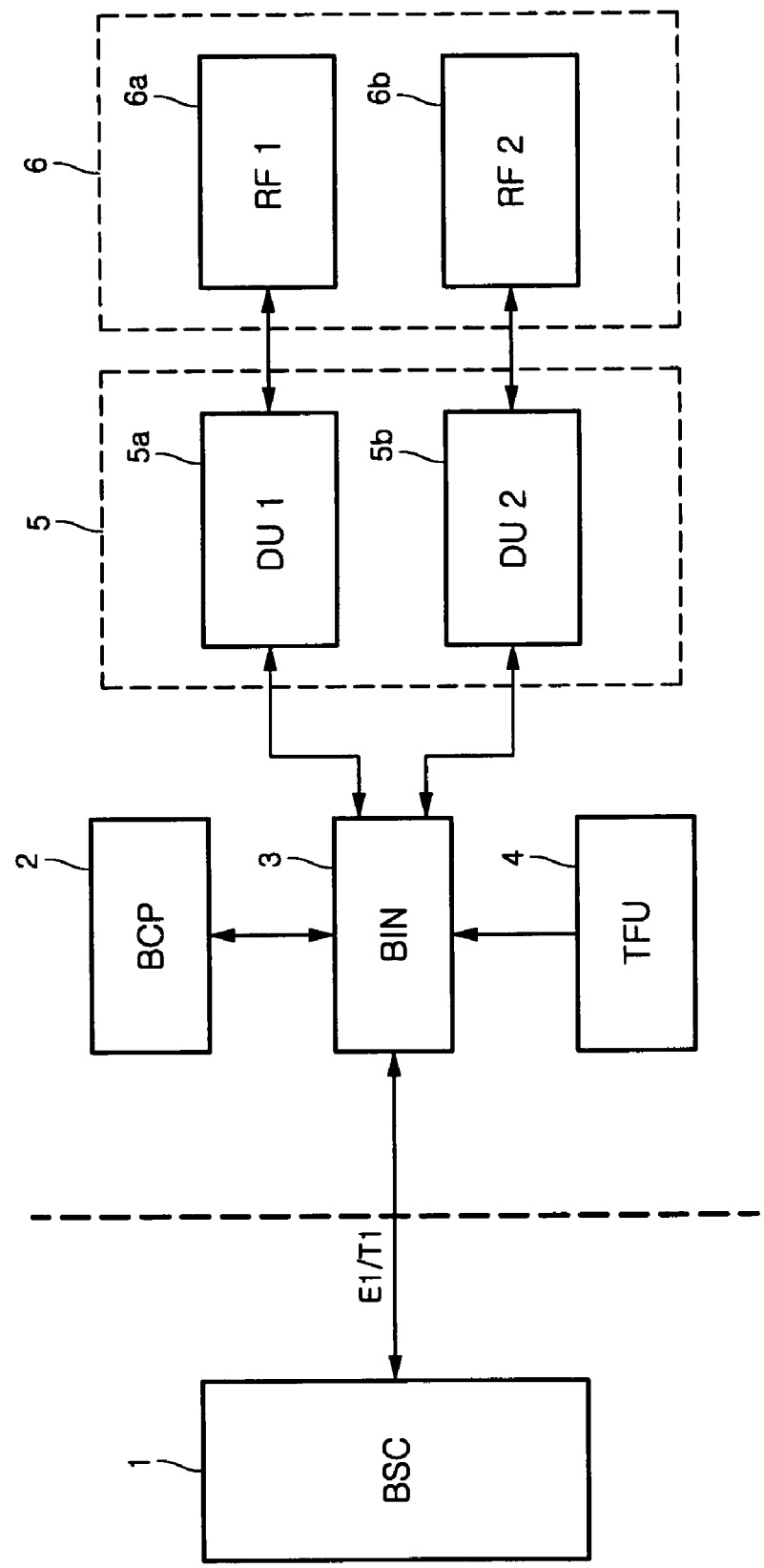
FIG. 1 is a schematic block diagram of a general mobile communication BTS system.
Figure 2:
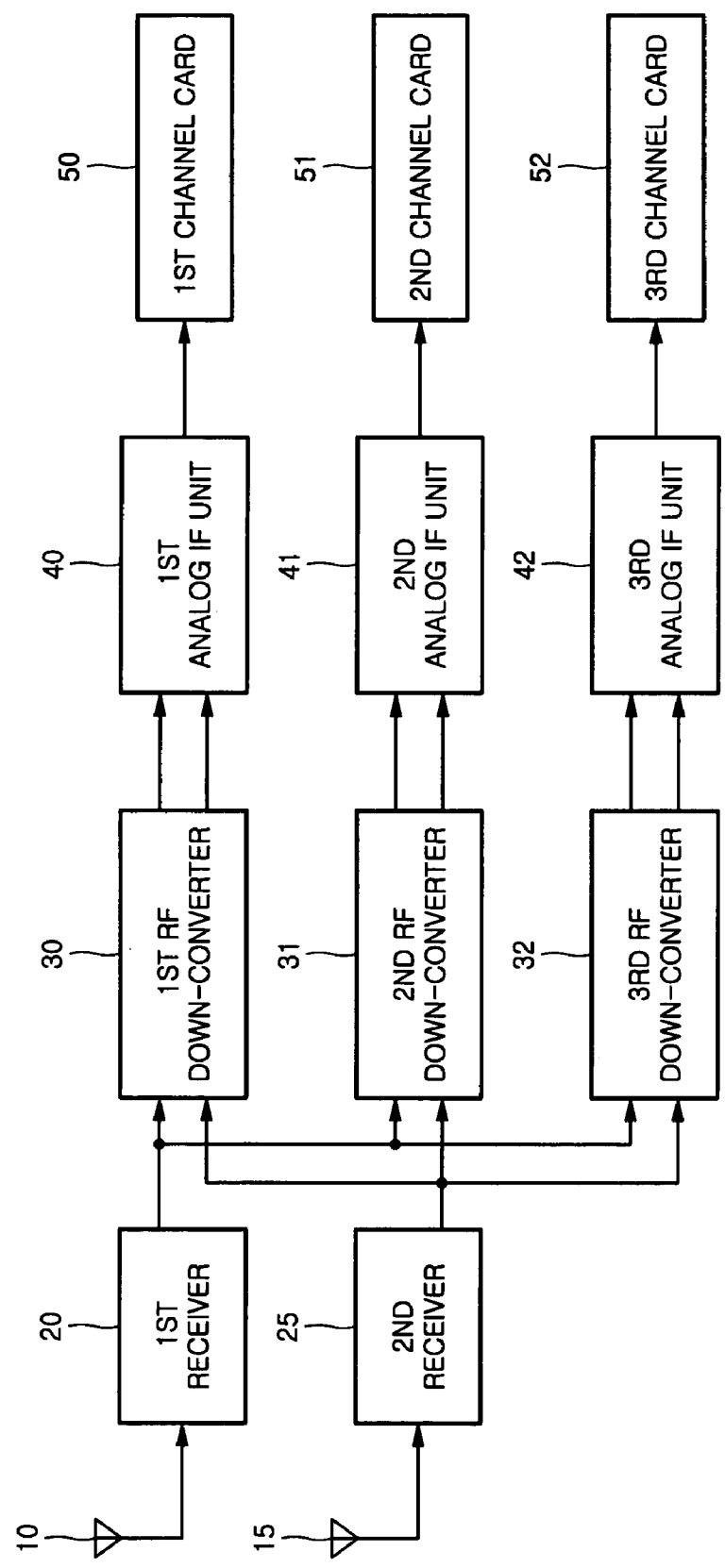
FIG. 2 is a schematic block diagram of an RF receiver for a CDMA mobile communication BTS system according to prior art.
Figure 3:
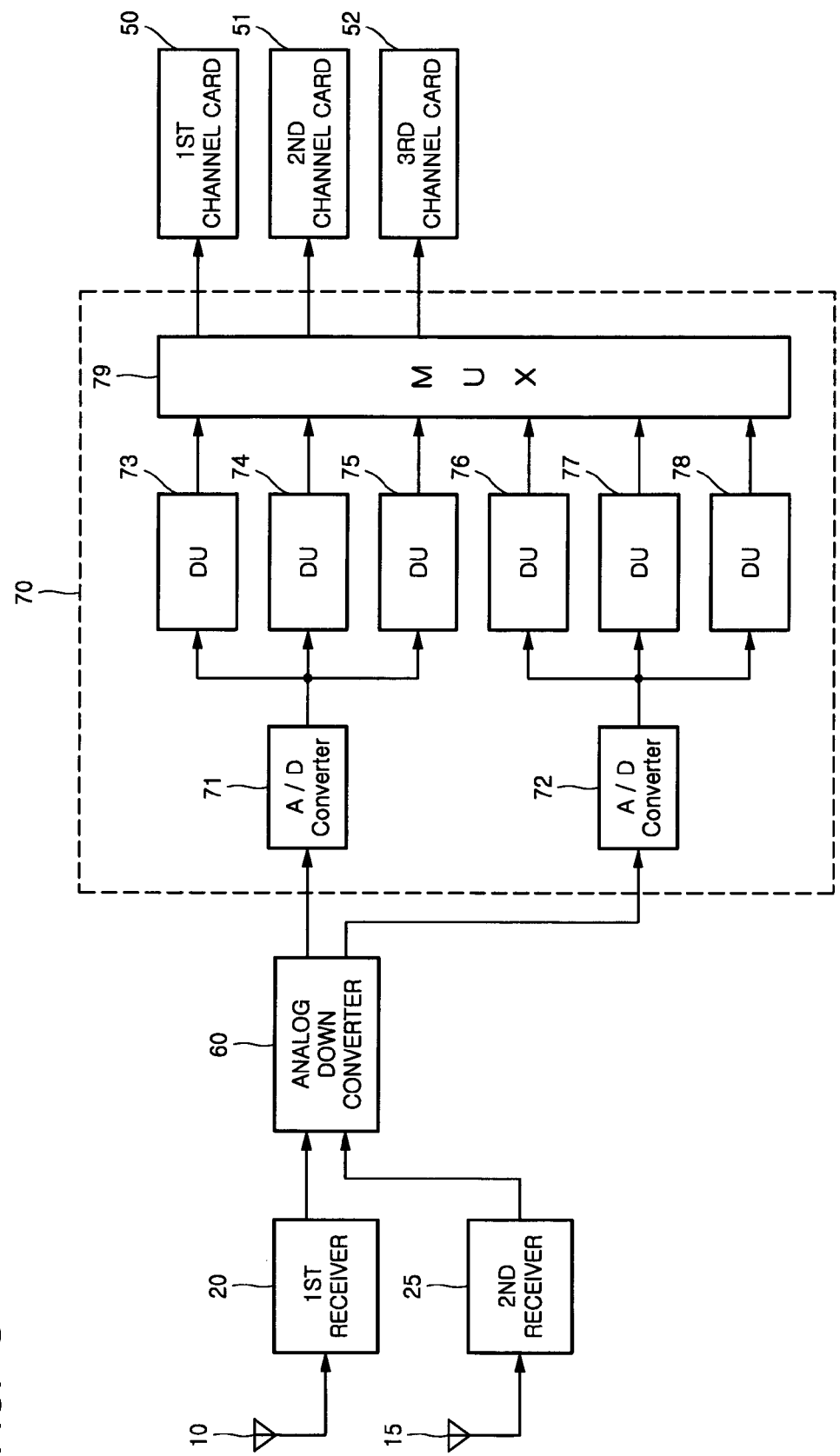
FIG. 3 is a schematic block diagram of an RF receiver for a CDMA mobile communication BTS system according to the present invention.
Figure 4:
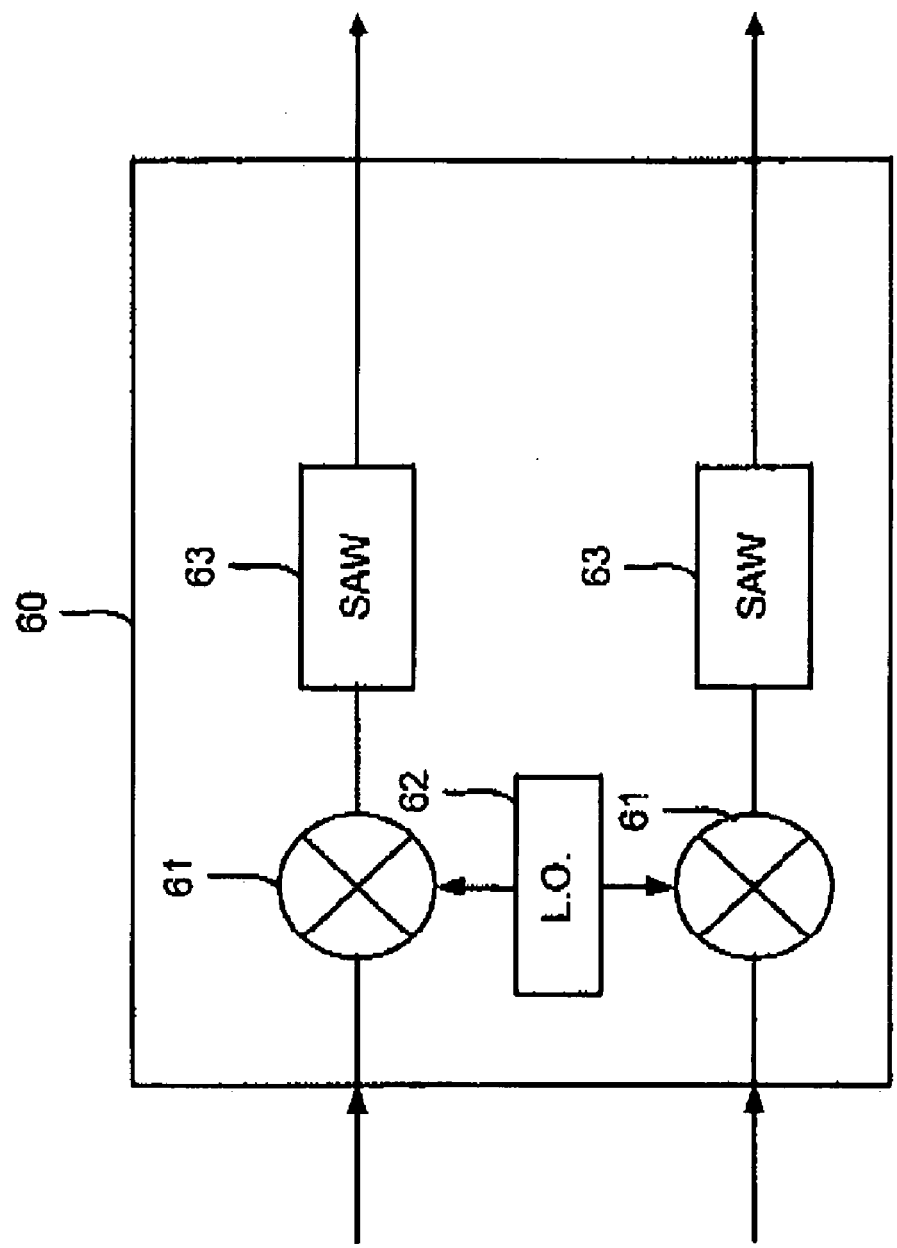
FIG. 4 is a schematic block diagram of an analog down-converter.

FIG. 3 is a schematic block diagram of the RF receiver for the CDMA mobile communication BTS system according to the present invention.

As illustrated, the RF receiver comprises: first and second antennas 10 and 15; first and second receive blocks 20 and 25 for receiving RF signals of 3 FA's from a mobile station on distinct paths, i.e., reception paths of "0" and "1", limiting the band of the 3FA RF signals, and amplifying the 3FA RF signals to a predetermined level; an analog down-converter 60 for down-converting the RF signals of 3 FA's to 3FA IF signals; and a digital down-converter 70 for converting the 3FA IF signals on the reception paths of "0" and "1" from the analog down-converter 60 to digital signals by FA's, dividing the digital signals into I and Q channels by FA's on the reception paths to down-convert the I/Q channel digital signals to baseband signals, and generating the I/Q channel baseband signals by FA's to first, second and third channel cards 50, 51 and 52.

The analog down-converter 60 comprises: a local oscillator 62 for generating a local frequency on the reception paths of "0" and "1"; a mixer 61 for mixing the local frequency from the local oscillator 62 with 3FA RF signals on the reception paths of "0" and "1" from the first and second receive blocks 20 and 25 and generating 3FA IF signals on the reception paths of "0" and "1"; and a wideband SAW filter 63 for limiting the band of the 3FA IF signals on the reception paths of "0" and "1" from the mixer 61 to a bandpass whose bandwidth corresponds to the bandwidth of 3 FA's.

The IF frequency on the reception paths of "0" and "1" is about 70 MHz and the bandwidth of the SAW filter is 3.75 MHz corresponding to the 3 FA's. The reason why the bandwidth for 3 FA's is 3.75 MHz lies in that a gap between the FA's amounts to 1.25 MHz.

The digital down-converter 70 comprises: A/D converters 71 and 72 on the reception paths of "0" and "1" for converting the band-limited IF signals from the analog down-converter 60 to digital signals; FA-based DU's 73 to 78 on the reception paths of "0" and "1" for dividing the digital signals from the A/D converters 71 and 72 into the FA-based I/Q channels for QPSK demodulation and down-converting the digital signals of I/Q channels to baseband signals; and a multiplexer 9 for FA-based multiplexing the baseband signals of I/Q channels on the reception paths of "0" and "1" from the FA-based DU's 73 to 78 and generating the multiplexed baseband signals to the first, second and third channel cards 50, 51 and 52 corresponding to the 3 FA's.

The baseband signals output from the DU 73 are I/Q channel baseband signals of 0FA on the reception path of "0", the baseband signals from the DU 74 are I/Q channel baseband signals of 1FA on the reception path of "0", and the baseband signals from the DU 75 are I/Q channel baseband signals of 2FA on the reception path of "0".

Similarly, the baseband signals output from the DU 76 are I/Q channel baseband signals of 0FA on the reception path of "1", the baseband signals from the DU 77 are I/Q channel baseband signals of 1FA on the reception path of "1", and the baseband signals from the DU 78 are I/Q channel baseband signals on 2FA on the reception path of "1".

The QPSK demodulation unit in the individual DU's 73 to 78 comprises: a channel divider (not shown) for dividing the digital signals from the A/D converters 71 and 72 into I and Q channels; a local oscillator (not shown) for generating a local frequency; a mixer for mixing the local frequency from the local oscillator with the I and Q channel signals divided at the channel divider and converting the mixed signals to I/Q channel baseband signals; and a digital FIR filter (not shown) for filtering the reception paths and the FA-based I/Q channel baseband signals from the mixer and generating the band-limited baseband signals to the multiplexer 79.

Now, a description will be made as to an entire operation of the above-structured RF receiver for the CDMA mobile communication BTS system according to the present invention.

First, the first and second receive blocks 20 and 25 receive 3FA RF signals for the reception paths of "0" and "1" from the antennas 10 and 15, respectively.

The first and second receive blocks 20 and 25 limit the signal band with the internal band-pass filters and amplify the signals with a linear noise amplifier, generating the amplified signals to analog down-converter 60.

The antenna 10 and the first receive block 20 are assigned to the reception path of "0", the antenna 15 and the second receive block 25 assigned to the reception path of "1". The antennas 10 and 15 and the first and second receive blocks 20 and 25 are used in common to all FA's assigned.

The analog down-converter 60 embeds two distinct blocks processing the reception paths of "0" and "1", respectively, and supports both the reception paths of "0" and "1".

The analog down-converter 60 receives the 3FA RF signals for the reception paths of "0" and "1" from the first and second receive blocks 20 and 25, down-converts them to IF signals of about 70 MHz using a single-stage mixer, and generates the IF signals to the A/D converters 71 and 72 corresponding to the reception path of "0" and "1" of the digital down-converter 70.

Namely, as the 3FA RF analog signals for the reception path of "0" from the first receive block 20 are input to the mixer in the analog down-converter 60 that processes the signals on the reception path of "0", the mixer mixes the 3FA RF signals from the first receive block 20 with the local frequency from the local oscillator to down-convert the 3FA RF signals to IF signals of 70 MHz. The down-converted IF signals of 70 MHz are band-limited with the SAW filter having a bandpass of 3.75 MHz that corresponds to the bandwidth of 3 FA's, and then output to the A/D converter 71 of the digital down-converter 70.

Meanwhile, upon receiving the 3FA RF analog signals for the reception path of "1" from the second receive block 25, the mixer in the analog down-converter 60 for processing the signals on the reception path of "1" mixes the 3FA RF signals from the second receive block 25 with the local frequency from the local oscillator to down-convert the 3FA RF signals to IF signals of 70 MHz. The down-converted IF signals of 70 MHz are band-limited with the SAW filter having a bandpass of 3.75 MHz that corresponds to the bandwidth of 3 FA's, and then output to the A/D converter 72 of the digital down-converter 70.

Thus the IF signals on the reception paths of "0" and "1" from the analog down-converter 60 are converted to digital signals at the first and second A/D converters 71 and 72 of the digital down-converter 70 and input to the two groups of three DU's 73, 74 and 75, and 76, 77 and 78, which are assigned by the reception paths of "0" and "1".

That is, the A/D converter 71 corresponding to the reception path of "0" outputs the IF digital signals on the reception path of "0" to the FA-based DU's 73, 74 and 75, the A/D converter 72 corresponding to the reception path of "1" generating the IF digital signals on the reception path of "1" to the FA-based DU's 76, 77 and 78.

The DU's 73, 74 and 75 divide the digital signals of 0FA, 1FA and 2FA output from the A/D converter 71 on the reception path of "0" into I- and Q-channel signals, perform QPSK demodulation to down-convert the digital signals to I- and Q-channel baseband signals, limit the band of the I- and Q-channel baseband signals for the respective FA's via a digital FIR filter, and generate the I- and Q-channel baseband signals for the respective FA's to the multiplexer 79.

The DU's 76, 77 and 78 divide the digital signals of 0FA, 1FA and 2FA output from the A/D converter 72 on the reception path of "1" into I- and Q-channel signals, perform QPSK demodulation to down-convert the digital signals to I- and Q-channel baseband signals, limit the band of the I- and Q-channel baseband signals for the respective FA's via a digital FIR filter, and generate the I- and Q-channel baseband signals for the respective FA's to the multiplexer 79.

That is, the DU 73 outputs I/Q channel baseband signals of 0FA on the reception path of "0", the DU 74 I/Q channel baseband signals of 1FA on the reception path of "0", the DU 75 I/Q channel baseband signals of 2FA on the reception path of "0".

Similarly, the DU 76 outputs I/Q channel baseband signals of 0FA on the reception path of "1", the DU 77 I/Q channel baseband signals of 1FA on the reception path of "1", the DU 78 I/Q channel baseband signals of 2FA on the reception path of "1".

The multiplexer 79 multiplexes the I/Q channel baseband signals of 0FA on the reception path of "0" output from the DU 73 and the I/Q channel baseband signals of 0FA on the reception path of "1" from the DU 76 to generate the multiplexed signals to the first channel card 50 corresponding to 0FA.

The multiplexer 79 multiplexes the I/Q channel baseband signals of 1FA on the reception path of "0" output from the DU 74 and the I/Q channel baseband signals of 1FA on the reception path of "1" from the DU 77 to generate the multiplexed signals to the second channel card 51 corresponding to 1 FA.

The multiplexer 79 multiplexes the I/Q channel baseband signals of 2FA on the reception path of "0" output from the DU 75 and the I/Q channel baseband signals of 2FA on the reception path of "1" from the DU 78 to generate the multiplexed signals to the first channel card 52 corresponding to 2FA.

The I/Q channel baseband signals corresponding to the respective FA's output from the multiplexer 79 are CDMA demodulated at the channel cards 50, 51 and 52 by FA's.

Accordingly, instead of the conventional RF down-converters and analog IF unit, the RF receiver for the CDMA mobile communication BTS system according to the present invention comprises the analog down-converter for processing multiple FA's and generating IF signals of 70 MHz having a bandwidth corresponding to the multiple FA's with a mixer, and the digital down-converter for digitally processing the respective FA's through A/D conversion of the IF signals of 70 MHz, thereby allowing simple multi-FA (3FA)-based expansion.

As described above, the RF receiver for the CDMA mobile communication BTS system according to the present invention presents some advantages in that: (1) the system can be expanded by multiple FA's (e.g., three FA's) during FA expansion by using an analog down-converter to processes multiple FA's and generate IF signals of 70 MHz having a bandwidth corresponding to the multiple FA's with a mixer, and a digital down-converter to digitally process the respective FA's through A/D conversion of the IF signals of 70 MHz; (2) the system needs only one analog down-converter for simultaneously processing 3 FA's and one digital down-converter for digitally processing the IF signals from the analog down-converter by FA's to down-convert the IF signals to baseband signals, thereby reducing the size of the system and hence the hardware cost; and (3) the system can be implemented with higher stability by digitally processing the down-conversion of the analog IF signals of multiple FA's to the baseband signals.

What is claimed is:

1. A radio frequency (RF) receiver for a code division multiple access (CDMA) mobile communication base station system, which has a plurality of receive blocks receiving RF signals via a plurality of antennas, and a plurality of frequency allocation (FA)-based channel cards, the RF receiver comprising:

an analog down-converting means for down-converting multi-FA RF signals on the respective reception paths output from the plural receive blocks to intermediate frequency (IF) signals; and a digital down-converting means for converting the IF signals of 3 FA's on the respective reception paths output from the analog down-converting means to digital signals by reception paths, dividing the digital signals into in-phase (I) and quadrature (Q) channels, converting the divided digital signals into I/Q channel baseband signals, and outputting the FA-based I/Q channel baseband signals to the channel cards corresponding to the respective FA's, wherein the analog down converting means comprises:

a local oscillator on the individual reception paths for generating a local frequency;

a mixer on the individual reception paths for mixing the local frequency generated from the local oscillator with the multi-PA RF signals on the individual reception paths output from the plural receive blocks to generate multi-FA IF signals on the individual reception paths; and an SAW filter on the individual reception paths for limiting the band of the multi-FA IF signals on the individual reception paths output from the individual mixer to the bandpass of a bandwidth corresponding to the multi-FA bandwidth.

2. The RE receiver as claimed in claim 1, wherein the multiple PA's are 3 PA's, the IF frequency on the individual reception paths of "0" and "1" is 70 MHz, and the bandwidth of the SAW filter is 3.75 MHz corresponding to the 3 FA's.

3. A radio frequency (RF) receiver for a code division multiple access (CDMA) mobile communication base station system, which has a plurality of receive blocks receiving RF signals via a plurality of antennas, and a plurality of frequency allocation (FA) based channel cards, the RF receiver comprising:

an analog down-converting means for down-converting multi-FA RF signals on the respective reception paths output from the plural receive blocks to intermediate frequency (IF) signals; and a digital down-converting means for converting the IF signals of 3 FA's on the respective reception paths output from the analog down-converting means to digital signals by reception paths, dividing the digital signals into in-phase (I) and quadrature (Q) channels, converting the divided digital signals into I/Q channel baseband signals, and outputting the FA-based I/Q channel baseband signals to the channel cards corresponding to the respective FA's, wherein the digital down-converting means comprises:

an analog-to-digital converter on the individual reception paths for converting the IF signals output from the analog down-converters to digital signals;

a FA-based digital unit on the individual reception paths for dividing the digital signals output from each analog-to-digital converter into the FA-based I/Q channels on the individual reception paths to perform QPSK, demodulation and down-converting the I/Q channel digital signals to I/Q channel baseband signals; and a multiplexer for multiplexing the reception paths and the I/Q channel baseband signals output from the FA-based digital unit and generating the multiplexed digital signals to the channel cards corresponding to the respective FA's.

4. The RE receiver as claimed in claim 3, wherein the digital unit comprises:

a first reception path 0FA digital unit for converting the digital signals output from the analog-to-digital converter corresponding to the first reception path to the I/Q channel baseband signals assigned to 0FA;

a first reception path 1FA digital unit for converting the digital signals output from the analog-to-digital converter corresponding to the first reception path to the I/Q channel baseband signals assigned to 1FA;

a first reception path 2FA digital unit for converting the digital signals output from the analog-to-digital converter corresponding to the first reception path to the I/Q channel baseband signals assigned to 2FA;

a second reception path 0FA digital unit for converting the digital signals output from the analog-to-digital converter corresponding to the second reception path to the I/Q channel baseband signals assigned to 0FA;

a second reception path 1FA digital unit for converting the digital signals output from the analog-to-digital converter corresponding to the second reception path to the I/Q channel baseband signals assigned to 1FA; and a second reception path 2FA digital unit for converting the digital signals output from the analog-to-digital converter corresponding to the second reception path to the I/Q channel baseband signals assigned to 2FA.

5. The RF receiver as claimed in claim 3, wherein the individual FA-based digital unit comprises:
- a channel divider for dividing the digital signals output from the analog-to-digital converter on the corresponding reception paths into I and Q channels for QPSK demodulation at the digital unit on the respective reception paths;
- a local oscillator for generating a local frequency;
- a mixer for mixing the local frequency generated from the local oscillator with the divided I/Q channel signals to convert the I/Q channel signals to I/Q channel baseband signals; and
- a digital FIR filter for band-pass filtering the respective reception paths and the FA-based I/Q channel baseband signals output from the mixer and generating the band-limited baseband signals to the multiplexer.

6. The RF receiver as claimed in claim 3, wherein the multiplexer multiplexes:
- the I/Q channel baseband signals output from the first reception path 0FA digital unit and the I/Q channel baseband signals output from the second reception path 0FA digital unit;
- the I/Q channel baseband signals output from the first reception path 1FA digital unit and the I/Q channel baseband signals output from the second reception path 1FA digital unit; and
- the I/Q channel baseband signals output from the first reception path 2FA digital unit and the I/Q channel baseband signals output from the second reception path 2FA digital unit, and generates the multiplexed signals to the channel cards corresponding to the respective FA's.

* * * * *